(12) United States Patent
Martin et al.

(10) Patent No.: US 10,913,414 B2
(45) Date of Patent: Feb. 9, 2021

(54) METHOD AND SYSTEM FOR WATER USAGE ON-BOARD A VEHICLE

(71) Applicant: Ford Global Technologies, LLC, Dearborn, MI (US)

(72) Inventors: Douglas Martin, Canton, MI (US); Clemens Verpoort, Monheim am Rhein (DE)

(73) Assignee: Ford Global Technologies, LLC, Dearborn, MI (US)

( * ) Notice: Subject to any disclaimer, the term of this patent is extended or adjusted under 35 U.S.C. 154(b) by 347 days.

(21) Appl. No.: 15/910,737

(22) Filed: Mar. 2, 2018

(65) Prior Publication Data

US 2019/0270419 A1  Sep. 5, 2019

(51) Int. Cl.
| | | |
|---|---|---|
| *B60R 16/08* | (2006.01) | |
| *F01P 7/14* | (2006.01) | |
| *F02D 41/38* | (2006.01) | |
| *B60T 5/00* | (2006.01) | |
| *F16D 65/84* | (2006.01) | |
| *B60C 23/19* | (2006.01) | |
| *B01D 5/00* | (2006.01) | |

(Continued)

(52) U.S. Cl.
CPC ............ *B60R 16/08* (2013.01); *B01D 5/006* (2013.01); *B01D 5/0075* (2013.01); *B01D 47/00* (2013.01); *B60C 23/19* (2013.01); *B60T 5/00* (2013.01); *C02F 1/001* (2013.01); *F01P 3/02* (2013.01); *F01P 7/14* (2013.01); *F02D 41/38* (2013.01); *F16D 65/0031* (2013.01); *F16D 65/807* (2013.01); *F16D 65/827* (2013.01); *F16D 65/84* (2013.01); *F16D 65/847* (2013.01); *C02F 2201/008* (2013.01); *F01P 2003/024* (2013.01); *F01P 2025/33* (2013.01); *F01P 2025/70* (2013.01); *F01P 2031/00* (2013.01); *F02D 2041/389* (2013.01); *F16D 2065/786* (2013.01)

(58) Field of Classification Search
CPC ...... B60R 16/08; B01D 5/006; B01D 5/0075; B01D 47/00
USPC ......................................................... 701/36
See application file for complete search history.

(56) References Cited

U.S. PATENT DOCUMENTS

| | | |
|---|---|---|
| 3,242,914 A | 3/1966 | Benger, Sr. |
| 3,817,221 A | 6/1974 | Nohira et al. |

(Continued)

FOREIGN PATENT DOCUMENTS

| | | |
|---|---|---|
| CN | 203756286 U | 8/2014 |
| EP | 2607647 A1 | 6/2013 |
| WO | 0204099 A1 | 1/2002 |

OTHER PUBLICATIONS

Bohm, M. et al., "Approaches for On-board Water Provision for Water Injection," ATZ Worldwide, vol. 118, No. 1, Jan. 2016, 4 pages.

*Primary Examiner* — Jean Paul Cass
(74) *Attorney, Agent, or Firm* — Geoffrey Brumbaugh McCoy Russell LLP

(57) ABSTRACT

Methods are provided for optimizing usage of water harvested or generated on-board a vehicle. An amount of water selected for injection or spraying purposes, as well as an order of water injection responsive to various vehicle operating conditions, is varied based on the amount of water to be delivered, as well as a current water level relative to a predicted future water level. The method allows water usage benefits to be maximized particularly when water availability is limited.

19 Claims, 5 Drawing Sheets

(51) Int. Cl.
- *B01D 47/00* (2006.01)
- *C02F 1/00* (2006.01)
- *F01P 3/02* (2006.01)
- *F16D 65/807* (2006.01)
- *F16D 65/847* (2006.01)
- *F16D 65/00* (2006.01)
- *F16D 65/827* (2006.01)
- *F16D 65/78* (2006.01)

(56) References Cited

U.S. PATENT DOCUMENTS

| | | | |
|---|---|---|---|
| 4,082,068 A | 4/1978 | Hale | |
| 4,725,359 A | 2/1988 | Ray | |
| 5,435,151 A | 7/1995 | Han | |
| 5,651,430 A * | 7/1997 | Rancourt | B64C 25/36 188/1.11 L |
| 6,296,957 B1 | 10/2001 | Graage | |
| 6,581,375 B2 | 6/2003 | Jagtoyen et al. | |
| 7,000,409 B2 | 2/2006 | Mazzetti | |
| 7,036,314 B2 | 5/2006 | Hoffjann et al. | |
| 7,040,259 B2 | 5/2006 | Sundholm | |
| 7,092,898 B1 * | 8/2006 | Mattick | G06Q 30/00 705/14.41 |
| 7,431,238 B2 | 10/2008 | Hoffjann et al. | |
| 7,739,985 B2 | 6/2010 | Keays | |
| 8,252,174 B2 | 8/2012 | Jones et al. | |
| 2002/0014259 A1 | 2/2002 | Hahnl | |
| 2004/0040322 A1 | 3/2004 | Engel et al. | |
| 2005/0284167 A1 * | 12/2005 | Morgan | B01D 5/009 62/272 |
| 2007/0022977 A1 * | 2/2007 | Crower | F02M 25/0222 123/25 C |
| 2008/0029357 A1 | 2/2008 | Krantz | |
| 2008/0302088 A1 * | 12/2008 | Koehler | F01N 3/2066 60/286 |
| 2011/0048039 A1 | 3/2011 | Kohavi et al. | |
| 2011/0214568 A1 | 9/2011 | Krantz | |
| 2011/0252863 A1 * | 10/2011 | McKay | B60T 17/221 73/9 |
| 2013/0291580 A1 | 11/2013 | Lindner | |
| 2014/0190148 A1 | 7/2014 | Ruhland et al. | |
| 2015/0217837 A1 * | 8/2015 | Szydlowski | B63B 25/12 114/74 R |
| 2016/0083936 A1 * | 3/2016 | Martin | B01D 5/006 261/128 |
| 2017/0276090 A1 * | 9/2017 | Kim | F01P 3/02 |
| 2019/0270419 A1 * | 9/2019 | Martin | F16D 65/84 |
| 2019/0291665 A1 * | 9/2019 | Martin | B60H 1/3205 |
| 2019/0291853 A1 * | 9/2019 | Bolton | F16D 57/06 |
| 2020/0078701 A1 * | 3/2020 | Mehmi | C02F 1/32 |

* cited by examiner

METHOD AND SYSTEM FOR WATER USAGE ON-BOARD A VEHICLE

FIELD

The present description relates generally to methods and systems for controlling usage of water, generated via a water harvesting system, on-board a vehicle including prioritizing an order of water usage for different functions.

BACKGROUND/SUMMARY

Water may be injected into a plurality of locations in a vehicle system to address various issues. For example, water may be injected into an engine intake manifold to humidify the air charge, or into an exhaust manifold to purify the exhaust gas. As another example, water may be injected directly into a combustion chamber for knock control or temperature control. In still other examples, water may be sprayed onto the surface of a vehicle component to clean or cool the component (such as onto a windscreen, a camera lens, a vehicle body, etc.), or to remove particulate matter. Further still, the water may be processed (e.g., filtered or distilled) to provide potable water that can be consumed by a vehicle occupant.

The disbursed water may be sourced from a water harvesting and/or generating system present on-board the vehicle. For example, water generated as a side product during vehicle operation, such as during fuel combustion in a cylinder, during operation of an air-conditioning system, due to condensation on a vehicle surface, etc., may be harvested, processed, and stored by the water harvesting system. One example of a water harvesting system available on-board a vehicle is shown by Martin et al in US20160083936. Additionally or optionally, the water generating system may include an electric water generator that uses electric power to harvest water from ambient humidity. An example of a water generating system coupled to a vehicle is shown by Engel et al. in US2004004322.

The inventors herein have recognized that the benefits of water usage may be limited by the availability of water on-board the vehicle. In particular, the water supply may be limited based on how much water can be generated/harvested on-board the vehicle via-a-vis how much water is required for knock control, dilution control, temperature control, component cleaning, occupant consumption, etc. As an example, if water injection is enabled for temperature control, due to the high water consumption rate during temperature control, there may be insufficient water available for knock control. As a result, spark may need to be retarded for knock control. The fuel penalty associated with the use of spark retard may offset or even outweigh the fuel economy benefit associated with water usage for temperature control. Further, in configurations where the water harvesting system includes an electric generator, the electrical power needed to generate the water may conflict with the electrical power requirement for other vehicle functions such as for propelling a hybrid vehicle, operating a compressor, regenerating a particulate filter, etc.

In one example, the above issues may be addressed by a method for a vehicle comprising: storing water generated on-board the vehicle in a reservoir, and varying an order of delivering water from the reservoir to at least a cylinder head, vehicle tires, and vehicle brake pads based on a water level in the reservoir and an exhaust particulate level. In this way, water usage may be prioritized if water availability is limited.

As one example, a vehicle may be configured with a water generation system for harvesting water generated on-board the vehicle, as well as water trapped in ambient air. The harvested water may be stored in a water reservoir. Based on the water level in the reservoir, water delivery to various locations may be prioritized. For example, during conditions when vehicle particulate matter emissions are elevated, water may be first be sprayed onto vehicle tires and brake pads. By spraying water on the brake pads, at a location where brake particulates exit the brake pads and rotors, and onto the tires at a location where tire particulates exit the tires, vehicle emissions may be controlled. Then, water may be sprayed onto or injected into engine locations that reduce particulate matter generation. As another example, during conditions when engine temperature is elevated, such as due to degradation of an engine cooling system, water may first be sprayed onto a cylinder head so that a rapid rise in engine temperature can be curbed before round-robin fuel cuts can reduce the source of engine temperature rise. Then, water may be sprayed or injected in locations secondarily affected by the elevated engine temperature. This reduces the likelihood of the engine being shut down for temperature control. A water controller of the vehicle may compare the current water level to a predicted water level over the drive cycle, the predicted water level based on water expected to be generated over the drive cycle, including a trend for water availability. Based on the comparison, the controller may assign a priority value to each of the respective uses of water, and determine the amounts to be injected for temperature control, particulate matter control, as well as other functions not listed above such as to meet an engine dilution demand. Optionally, the controller may determine a plurality of water level thresholds for each of the functions, and compare the amounts to be injected to those water level thresholds. Delivery of the selected amount for a given function may then be enabled (or delayed) based on the comparing. For example, water usage may be varied when the water level is already low based on whether the water level in the reservoir is predicted to rise or fall over the drive cycle. Further, water usage may be varied based on the quality of the water available in the water reservoir.

In this way, water usage prioritization may be used in order to achieve the highest vehicle (or engine) efficiency benefit per unit of water, when the water supply is limited. By assigning a priority value to water injection usages based on current operating conditions, as well as a comparison of current water levels relative to predicted water levels in a water reservoir, and by injecting water based on the highest priority value when the water supply is limited, the efficiency benefit per unit of water injected can be substantially increased. By stopping, delaying, or reducing water delivery for a given use during operating conditions having a lower efficiency benefit, vehicle performance can be maintained elevated until the water reservoir becomes empty. By also varying the selection of the water injection amount based on the estimated quality of water in the water reservoir, water usage benefits can be extended over a wider range of operating conditions, even when the water supply is of poor quality. In this way, water usage can be maximized, particularly when operating with a limited water supply.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the

DETAILED DESCRIPTION

Figure 1:
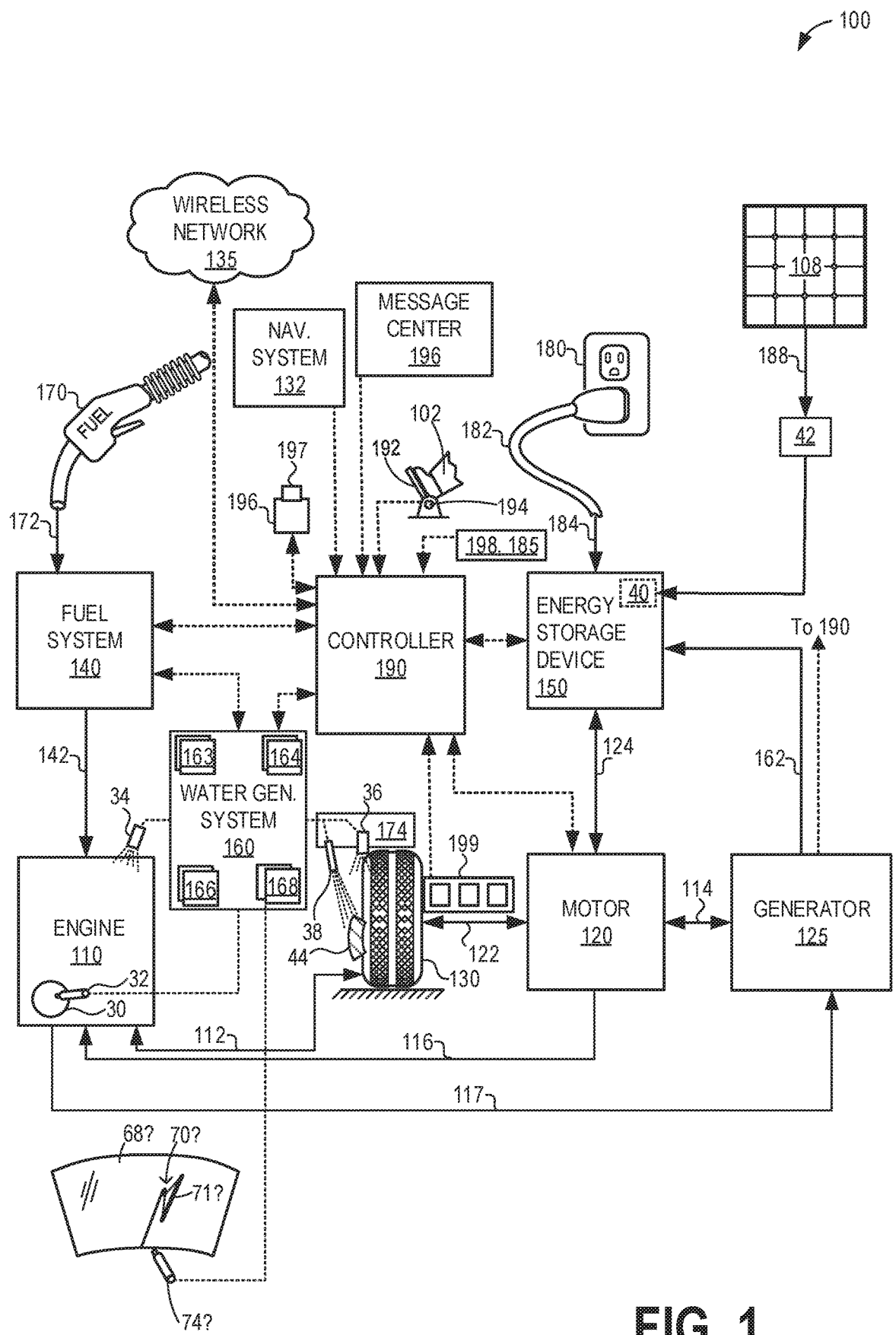
FIG. 1 shows a schematic diagram of a vehicle system including an on-board water generation system.

The following description relates to systems and methods for leveraging the benefits of injecting water into and/or spraying water onto one or more vehicle locations from a water generation system coupled on-board a vehicle, such as the vehicle system of FIG. 1. The water generation system, such as the system of FIG. 2, may be configured to harvest and collect water generated on-board the vehicle during vehicle operation, such as during cylinder combustion, air conditioner operation, ambient water condensation, etc. In addition, the water generation system may be configured to use electrical power to harvest water from ambient air. A controller may be configured to perform a control routine, such as the example routine of FIG. 3, to assign priority values to distinct water delivery amounts for various functions, such as engine temperature control and particulate matter emission control, based on factors including water availability and water quality. An order or water delivery is then adjusted based on the priority values so that the water injection having the highest priority value is delivered first, as shown with reference to the routine of FIG. 4. An example water injection adjustment is described with reference to FIG. 5. In this way, the vehicle performance benefits of water injection can be leveraged even when the water supply is limited.

FIG. 1 illustrates an example vehicle propulsion system 100. Vehicle propulsion system 100 includes a motor 120 and a fuel burning engine 110. As a non-limiting example, engine 110 is an internal combustion engine and motor 120 is an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (e.g., set to a deactivated state) where combustion of fuel at the engine is discontinued. For example, under select operating conditions, motor 120 may propel the vehicle via drive wheel 130 as indicated by arrow 122 while engine 110 is deactivated (herein also referred to as an electric-only mode).

During other operating conditions, engine 110 may be set to a deactivated state (as described above) while motor 120 may be operated to charge an energy storage device 150. For example, motor 120 may receive wheel torque from drive wheel 130, as indicated by arrow 122, and may convert the kinetic energy of the vehicle to electrical energy for storage at energy storage device 150, as indicated by an arrow 124. This operation may be referred to as regenerative braking of the vehicle. Thus, motor 120 may function as a generator in some examples. However, in other examples, a generator 125 may instead receive wheel torque from drive wheel 130 and may convert the kinetic energy of the vehicle to electrical energy for storage at energy storage device 150, as indicated by an arrow 114. As an additional example, motor 120 may use energy stored at energy storage device 150 to crank engine 110 in a starting operation, as indicated by an arrow 116.

During still other operating conditions, engine 110 may be operated by combusting fuel received from a fuel system 140, as indicated by an arrow 142. For example, engine 110 may be operated to propel the vehicle via drive wheel 130, as indicated by an arrow 112, while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle system 100 may be configured as a series type vehicle propulsion system, whereby the engine does not directly propel the drive wheels. Rather, engine 110 may be operated to power motor 120, which may in turn propel the vehicle via drive wheel 130, as indicated by arrow 122. For example, during select operating conditions, engine 110 may drive generator 125, as indicated by arrow 117, which may in turn supply electrical energy to one or more of motor 120, as indicated by an arrow 114, or energy storage device 150, as indicated by arrow 162. As another example, engine 110 may be operated to drive motor 120, which may in turn function as a generator to convert the engine output to electrical energy. The electrical energy may be stored at energy storage device 150 for later use by the motor, for example.

Fuel system 140 may include one or more fuel tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to range extender engine 110, where they may be combusted at the engine to produce an engine output. The engine output may be utilized to generate electricity by operating alternator 125, said electricity used to directly power motor 120, or to recharge energy storage device 150.

In some embodiments, energy storage device 150 may be configured to store electrical energy that may be supplied to other electrical loads residing on-board the vehicle (other than the motor), including a cabin heating and air conditioning system, engine starting system, headlights, cabin audio and video systems, etc. As a non-limiting example, energy storage device 150 may include one or more batteries and/or capacitors.

Propulsion system 100 further includes a water generation system 160 configured to capture water vapor and condensation occurring on the vehicle system. The captured condensation may be generated (or emitted) as a by-product of various vehicle operations, such as condensate trapped at one or more heat exchangers of the vehicle system. As an example, where engine 110 is a boosted engine including an intake compressor, condensate may be generated at a charge air cooler coupled to the engine intake downstream of the compressor during boosted engine operation. As another example, where the vehicle includes an air-conditioning system, condensate may be generated at a condenser of the air-conditioning system during a vehicle cabin cooling operation. As yet another example, water may be generated by a fuel separator coupled to fuel system 140. Still other vehicle components whose operation can generate condensate include motor 120, a fuel cell, an electric motor cooling system, etc. Water generation system 160 may additionally include an electric motor for harvesting water from humidity in ambient air. As elaborated with reference to FIG. 2, water may be collected from the various sources and transported to a reservoir where the water is processed before being used for various applications on-board the vehicle system. Accordingly, water generation system may include various components such as one or more pumps 162, one or more valves 164 (such as flow control valves, check valves, dispensing valves, etc.), one or more water processing devices (such as filters, distillers, ion-exchangers, etc.) 166, and one or more reservoirs 168. Still other components may be included in water generation system 160 without departing from the scope of this invention.

The harvested water may be used for spraying onto or injected into various vehicle components based on operating conditions. As one example, water may be injected into an engine cylinder 30 via a water injector 32. The water injector 32 may inject water directly into the engine cylinder 30, for example, responsive to an indication of engine knock. Additionally or optionally, water injector 32 may inject water into an intake manifold of engine 110. For example, water may be injected into the intake manifold responsive to a demand for engine dilution, such as when combustion stability is limited.

As another example, water may be sprayed onto the engine, such as onto a cylinder head, by cylinder head nozzle 34. Water may be sprayed onto the cylinder head for engine temperature control. For example, when an engine cooling system fails, the cylinder head temperature may exceed an engine shutdown temperature before round-robin fuel injector cuts can limit the temperature increase at the engine. Responsive to the cylinder head temperature rise (e.g., a higher than threshold temperature or a higher than threshold rate of rise in temperature), a pump of water generation system 160 may be operated to spray water onto the cylinder head via cylinder head nozzle 34. Operation of the nozzle may generate a mist that limits or slows down the rapid rise in temperature at the cylinder head. The amount of water dispensed may be a function of the temperature rise. The nozzle may be optimized to spread the spray over a maximum area of the cylinder head, or optimized to concentrate the spray to a localized hot area on the head, as dictated by the heat pattern generated in the cylinder head during cooling system degradation. The individual spray pattern can be selected by the design of a nozzle adapted from fuel injectors whose spray pattern is known. For nozzles passing water with particulates, a single larger hole for the nozzle may be used to pass the dirt and preclude nozzle contamination or blockage.

As another example, water pumped from water generation system 160 may be supplied to a windshield wiper system that enables cleaning of a vehicle windshield 68. Windshield 68 may be a front or rear windshield of the vehicle. The windshield wiper system includes at least one windshield wiper 70 operated by a wiper motor (not shown). In response to an operator demand, and based on input from controller 190, the wiper motor may be energized causing wiper 70 to make multiple sweeping cycles known as wipes or sweeps over windshield 68. The wipes or sweeps enable wiper blade 71 to remove moisture, debris, and foreign particles from the surface of windshield 68. While wiper blade 71 is sweeping, based on request from a vehicle operator, controller 190 may intermittently inject or squirt a wiper fluid (herein also referred to as a washer fluid) onto the windshield via wiper injector 74. In one example, the wiper fluid includes water sources from a reservoir of water generation system 160. Alternatively, washer fluid may be stored in a wiper fluid reservoir from where it is delivered to the windshield, and water may be provided to the reservoir from water generation system 160. The washer fluid stored in the reservoir may include a combination of water and alcohol, such as methanol or isopropanol.

Water sourced from water generation system 160 may also be used for particulate matter (PM) control. For example, water may be injected into engine 110 (e.g., into an engine cylinder, an engine intake, or an engine exhaust) to reduce PM generation and emission. As another example, water may be sprayed onto a tire covering drive wheel 130 via tire nozzle 36. Tire nozzle 36 may be coupled to an undercarriage 174 of the vehicle, such as at a location just above drive wheel 130. Water may be sprayed by tire nozzle 36 onto or towards the tire to remove particulates from the surface of the tire. Alternatively, water may be sprayed by tire nozzle 36 into the air at a location where tire particulates exit the tire when turning at high speed, such as behind the rear lower portion of the tires where it departs the ground during rotation. Since tire particulate generation increases during particular vehicle maneuvers and when vehicle speed is high, tire nozzle 36 may be selectively operated during conditions when the vehicle is accelerating, turning, and/or maneuvering a corner. This allows the particulates released from the tire into the air to be coagulated in the sprayed mist, and fall to the ground instead of remaining air-borne.

Likewise, water may be sprayed onto brake pads 44 coupled to drive wheel 130 via brake nozzle 38. Brake nozzle 38 may also be coupled to undercarriage 174, at a location above drive wheel 130, and adjacent to tire nozzle 36. Water may be sprayed by brake nozzle 38 onto or towards the brake pads 44 to remove particulates from the surface of the brake pad. Alternatively, water may be sprayed by brake nozzle 38 into the air at a location where brake particulates exit the brake pads and associated brake rotors during forward motion. Since brake particulate generation increases during braking events, brake nozzle 38 may be selectively operated during braking maneuvers of the vehicle. This allows the particulates released from the brake pads 44 into the air to be coagulated in the sprayed mist, and fall to the ground instead of remaining air-borne.

Figure 2:
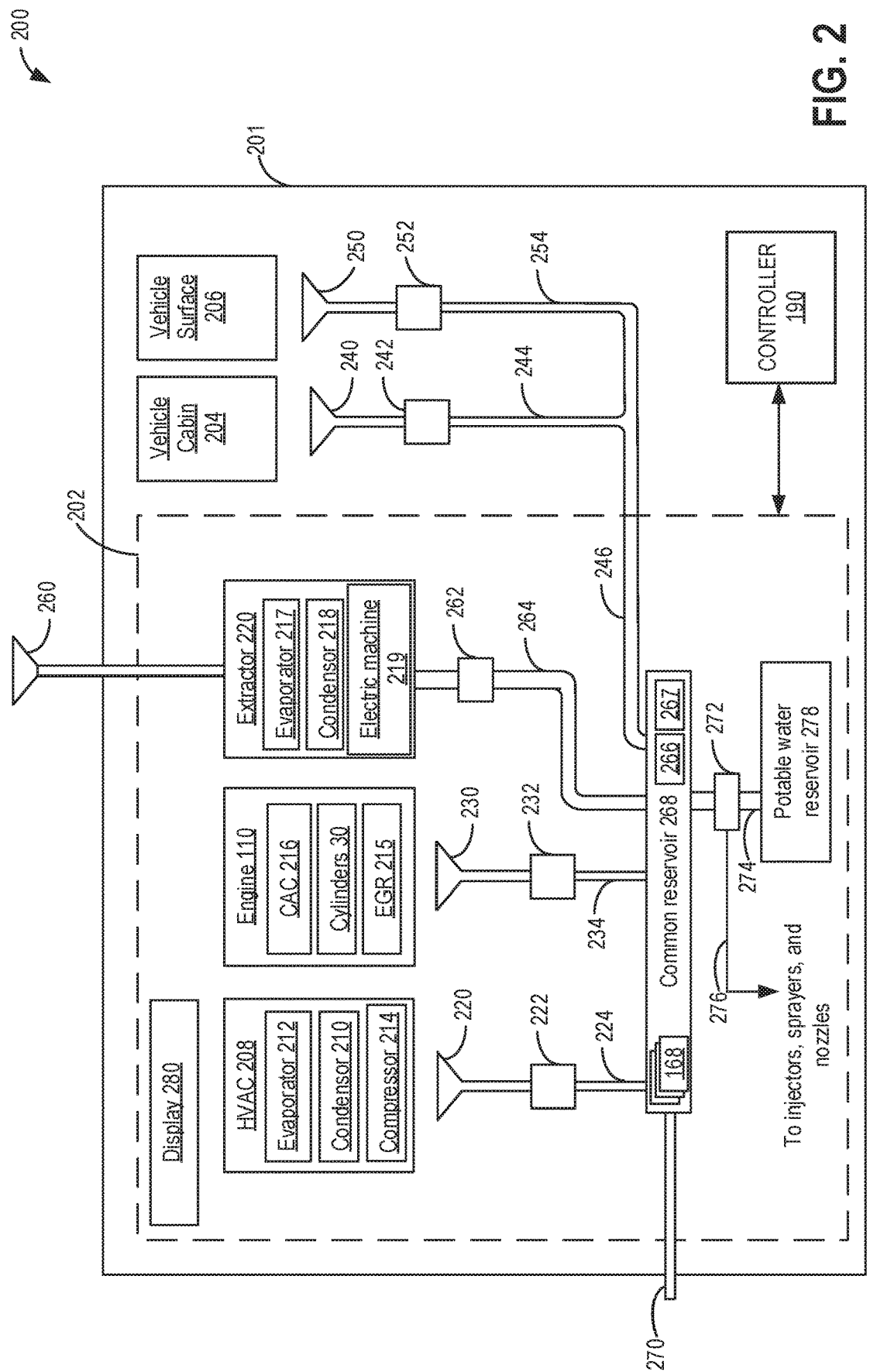
FIG. 2 shows an example embodiment of an on-board water generation system that may be included in the vehicle system of FIG. 1.

Further still, as elaborated with reference to FIG. 2, water harvested by the water generation system 160 may be processed to make potable water that is available on-board the vehicle to a vehicle operator.

Figure 3:
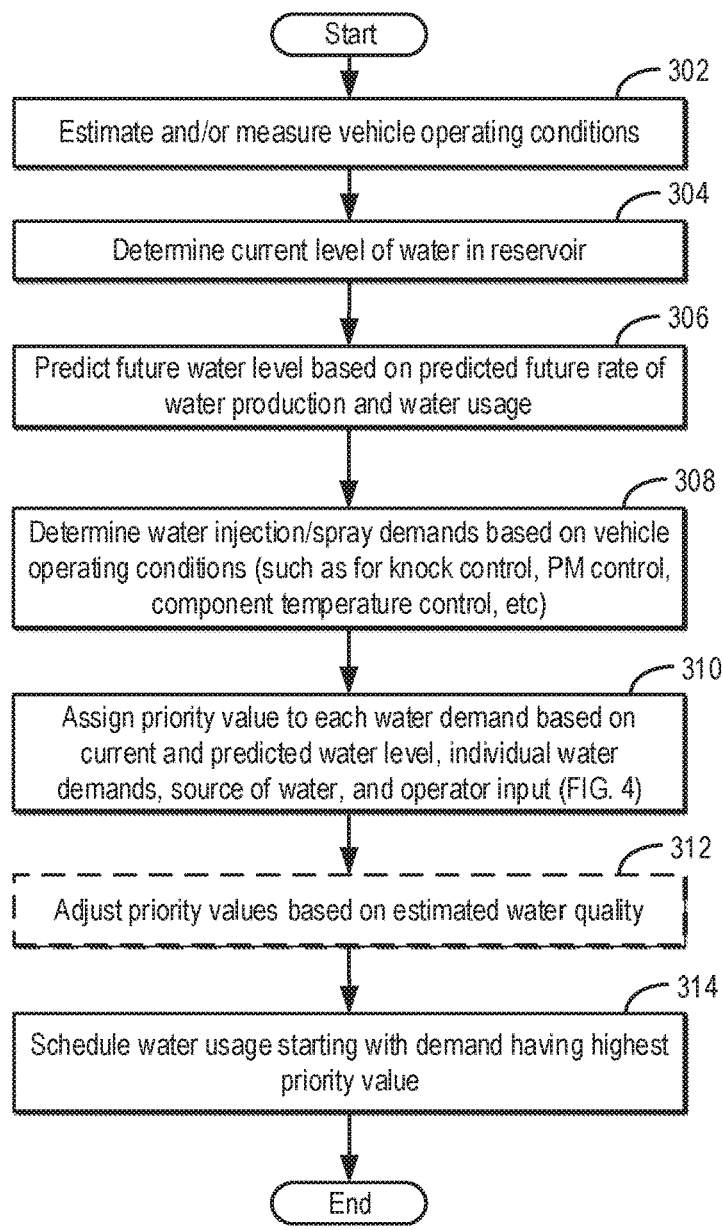
FIG. 3 shows a high level flow chart for varying water usage from an on-board water generation system based on a water level of a water reservoir and vehicle operating conditions.
Figure 4:
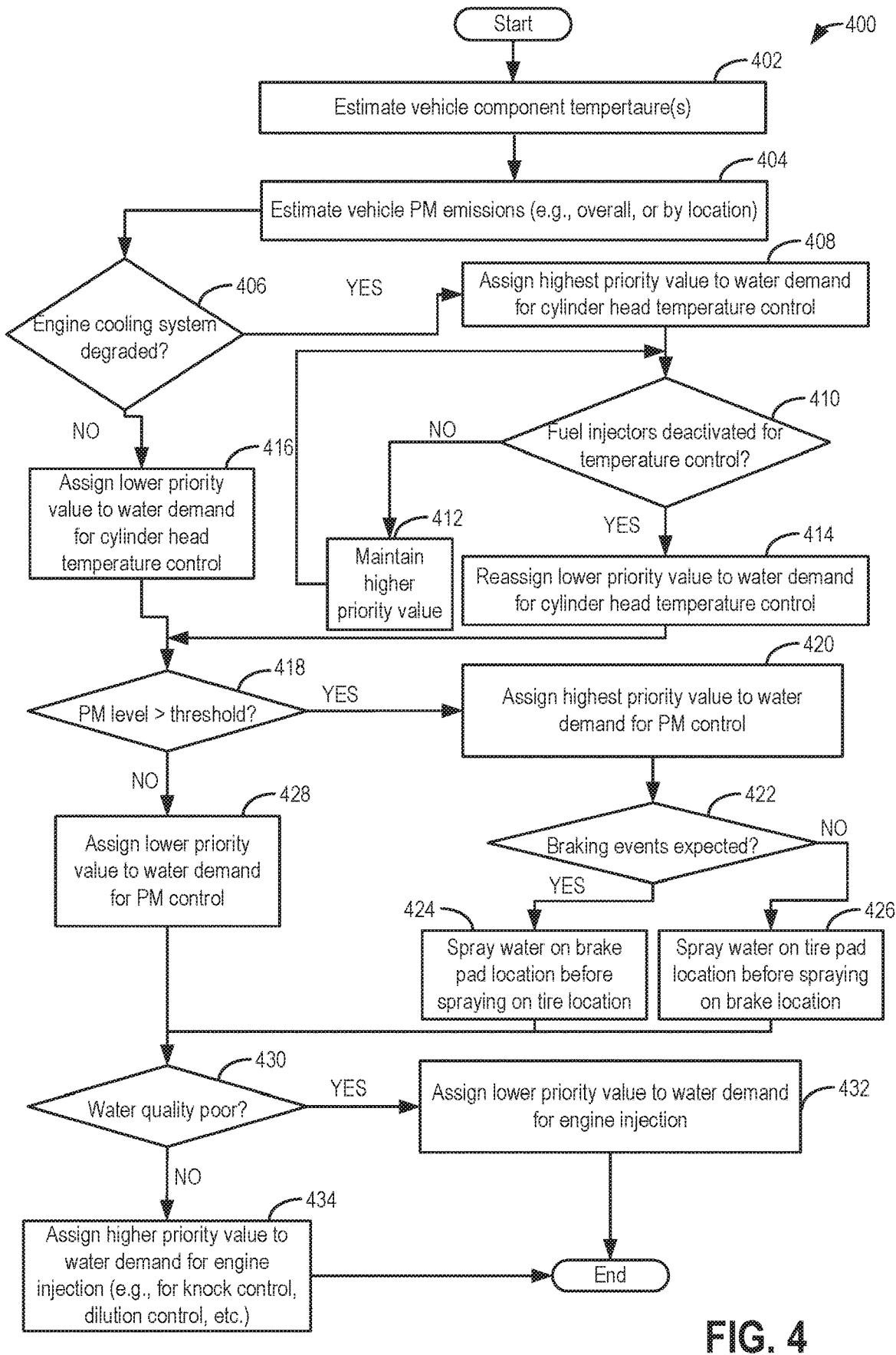
FIG. 4 shows a high level flow chart for adjusting an order of delivering water to an engine, vehicle tire surface, and vehicle brake surface based on a water level of a water reservoir and vehicle operating conditions.

As elaborated with reference to FIGS. 3-4, controller 190 may balance the water demands from the different vehicle components on the water generation system with the water level in a reservoir of the water generation system. In particular, based on vehicle operating constraints (such as related to component temperature or related to particulate matter levels), and further based on water availability at the water reservoir and an amount of water that needs to be delivered, controller 190 may assign each water demand a different priority value. Then, water may be dispensed in accordance with the assigned priority values with the highest priority value associated water demand being injected first. Identification of, and presence in, an urban "particulate green zone" may cause the priority of brake and tires particulate suppression to rise to a higher (e.g., top priority) until the vehicle passes out of the green zone. This zone would be identified by GPS coordinates or by a locally broadcast signal based on local PM detectors.

Vehicle system 100 may also include one or more solar cells 108, operative to convert incident solar radiation into electrical energy. The solar cells 108 may be electrically coupled to a solar battery 40 via a charge controller 42. Solar cells 108 and charge controller 42 are operative to supply electrical current for charging solar battery 40. In this example, solar battery 40 is housed within and electrically coupled to energy storage device 150, but in other configurations, solar battery 40 may be electrically coupled to energy storage device 150 while being housed separately. Solar battery 40 may thus be configured to provide or receive charge from energy storage device 150, depending on engine operating conditions, charge status, and battery requirement(s). In still other configurations, solar battery 40 may be both physically and electrically isolated from energy storage device 150. In some examples, solar battery 40 may be configured to independently supply charge directly to vehicle actuators and devices. In still further examples, charge controller 42 may be used to directly supply power to vehicle actuators and devices without requiring charge to first be stored in solar battery 30.

Solar cells 108 may be mounted on any convenient exterior surface of the vehicle, for example a vehicle roof, hood, trunk, etc. However, solar cells 108 may additionally or alternatively be mounted on the interior of the vehicle, such as on a dashboard or other passenger compartment surface in proximity to a window or interior light bulb. In general, the solar cells are operative to convert solar radiation incident thereon into electrical energy. In some embodiments, solar cells 108 may comprise a series of photovoltaic cells formed from an amorphous semi-conductor material, such as silicon. Additionally, individual photovoltaic cells may be interconnected so as to provide a constant flow of electrical energy to a common output cable 188, which electrically couples solar cells 108 to charge controller 42 and solar battery 40. In this way, solar cells 108 may generate electrical energy with which to propel the vehicle or power one or more additional vehicle actuators and devices, including components (e.g., an electric motor and/or pumps) of water generation system 160.

Control system 190 may communicate with one or more of engine 110, motor 120, fuel system 140, energy storage device 150, and alternator 125. Control system 190 may receive sensory feedback information from one or more of engine 110, motor 120, fuel system 140, energy storage device 150, and alternator 125. Further, control system 190 may send control signals to one or more of range extender engine 110, motor 120, fuel system 140, energy storage device 150, and alternator 125 responsive to this sensory feedback. Control system 190 may receive an indication of an operator requested output of the vehicle propulsion system from a vehicle operator 102. For example, control system 190 may receive sensory feedback from pedal position (PP) sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle, whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected from the power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it will be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, in response to the vehicle operator actuating refueling button 197, a fuel tank in the vehicle may be depressurized so that refueling may be performed.

The vehicle system 100 may also include one or more sensors such as an ambient temperature or humidity sensor 198, an engine temperature sensor 185, and a vehicle speed sensor 199. In one example, engine temperature sensor 185 is an engine coolant temperature (ECT) sensor wherein the engine temperature is inferred from the engine coolant temperature. In another example, engine temperature sensor 185 is a cylinder head temperature (CHT) sensor wherein the engine temperature is inferred from the cylinder head temperature. Still other sensors may be coupled to the vehicle system.

A vehicle instrument panel 196 may include indicator light(s) and/or a text-based display in which messages are displayed to an operator. The vehicle instrument panel 196 may also include various input devices for receiving an operator input, such as buttons, touch screens, voice input/ recognition, etc. For example, the vehicle instrument panel 196 may include a refueling button 197, which may be manually actuated or pressed by the vehicle operator to initiate refueling. For example, in response to the vehicle operator actuating refueling button 197, a fuel tank in the vehicle (e.g., fuel tank 144) may be depressurized so that refueling may be performed. As another example, a water level in a water reservoir 168 of the water generation system 160 may be displayed to a vehicle operator via the instrument panel 196.

Control system 190 (herein also referred to as controller 190) may be communicatively coupled to other vehicles or infrastructures using various appropriate communications technologies. For example, control system 190 may be coupled to other vehicles or infrastructures via a wireless network 135, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. Information exchanged between vehicles can be either directly communicated between vehicles or can be multi-hop. In some examples, longer range communications (e.g. WiMax) may be used in place of or in conjunction with V2V or V2I2V to extend the coverage area by a few miles. In still other examples, vehicle control system 190 may be communicatively coupled to other vehicles or infrastructures via wireless network 135 and the internet (e.g. the cloud).

Vehicle system 100 may also include an on-board navigation system 132, such as a Global Positioning System (GPS), that an operator of the vehicle may interact with. The navigation system 132 may include one or more location sensors for assisting in estimating vehicle speed, vehicle altitude, vehicle position/location, etc. This information may also be used to infer engine operating parameters, such as local barometric pressure. In additional, the information may be used for travel route planning including weather and traffic conditions along a planned route of travel. As discussed above, control system 190 may be further configured to receive information via the internet or other communication networks. Information received from the GPS may be cross-referenced to information available via the internet to determine local weather conditions, local vehicle regulations, etc.

The controller 190 receives signals from the various sensors of FIG. 1 and employs the various actuators of FIG. 1 to adjust engine operation based on the received signals and instructions stored on a memory of the controller. For example, based on signals received from engine temperature sensor 185, the controller may send a signal to a cylinder head water nozzle 34 to spray water onto the cylinder head.

Turning now to FIG. 2, a detailed embodiment 200 is shown for a water generation system 202 coupled in a vehicle 201 configured for on-road propulsion. The embodiment enables water to be harvested from one or more components of the vehicle, as well as from ambient humidity. Components previously introduced in FIG. 1 are numbered the same and are not reintroduced for reasons of brevity. In one example, water generation system 202 includes water generation system 160 of FIG. 1, and vehicle 201 includes vehicle system 100 of FIG. 1.

Water generation system 202 is coupled to various components of vehicle 201. For example, water generation system 202 is coupled to a heating, ventilation, and air-conditioning (HVAC) system 208. HVAC system 208 is configured to adjust a temperature of vehicle cabin 204 based on input from a vehicle occupant. HVAC system 208 includes a condenser 210, an evaporator 212, and a compressor 214. The condenser 210 is essentially a heat-exchanger disposed outside of a passenger compartment of the vehicle while the evaporator is essentially a heat-exchanger disposed within the passenger compartment of the vehicle. The compressor 214 may be driven by the engine 110, such as by the use of an auxiliary drive belt off a crankshaft (not shown), or an auxiliary drive belt off an electric machine (such as electric motor 120 of the hybrid driveline of FIG. 1), or by having a separate compressor motor (not shown). The compressor motor may be provided energy from an on-board energy storage device, which may be a high voltage traction battery or from a 12 volt battery (not shown).

Other components that may be included in HVAC system 208, but are not shown, include a pressure regulator, an expansion valve, an accumulator, a receiver, a desiccant filter, or the like. A series of ducts may route conditioned air from the evaporator 212 into the vehicle cabin 204. Optionally, a fan (not shown) may be employed adjacent the condenser 210 to aid in improved airflow across the heat-exchangers, an/or a fan may be disposed within the series of ducts to aid in airflow across the heat-exchangers.

As HVAC system 208 runs, water may condense on the condenser 210 and the evaporator 212. Condensation is generally known as a change in the state of water vapor to liquid water when in contact with any surface. Generally when the HVAC system 208 is used to cool vehicle cabin 204, condensation may occur at least on the condenser 210 which is located outside of vehicle cabin 204 and is in fluid contact with the ambient environment. The water that condenses on condenser 210 is from water vapor formerly held within air surrounding the condenser.

Water generation system 202 may include an HVAC water collector 220 located near condenser 210 and configured to collect condensed water from the condenser 208. The collector may be located below the condenser 208 (or at a location near a bottom surface of the condenser 208) so that water may be transferred from the condenser 210 to the HVAC water collector 220 using gravity. The HVAC collector 220 may be fluidly connected to one or more HVAC water processing components 222 including an HVAC water collection valve. Other water processing components 222 coupled to HVAC water line 224 may include a collection pump, a collection filter, etc.

For example, the collection valve may be a three-way valve, or a series of T-shaped valves that can be electrically actuated. By adjusting the operation of the collection valve, water may be diverted from HVAC water collector 220 to a common water reservoir 268. In some embodiments, water collected from the HVAC system may be initially stored in one of a plurality of water reservoirs 168, such as a water reservoir dedicated to collecting water from the HVAC system. The water may be treated and processed locally in the dedicated water reservoir before being transferred into common water reservoir 268 where the water collected from the HVAC system is merged with water collected from other sources.

As another example, HVAC water line 224 may include a filter with a mesh screen that is used for the separation of solids (such as small particulates) from the collected fluid by interposing a medium through which the fluid can pass but not solids larger than the mesh sizing. The filter may also be a chemical or ultraviolet filtration device which may be used to filter out undesirable bacteria, organic carbons, or the like. The filter may be included in the HVAC water line 224 after or before the collection valve. Similarly, HVAC water line 224 may include a pump located before or after the filter. The system may also operate without a filter or pump, or with multiple filters and pumps along HVAC water line 224 to provide a desired degree of filtration, to move water, or to provide pressure where desired. As will be elaborated herein, each of the different water lines may include a different set of water processing components for processing water differently based on the source of the water as well as the intended use of the water. For example, if the water harvested from the HVAC system 208 is used primarily for injecting onto the cylinder head (such as via cylinder head nozzle 34 of FIG. 1), onto tires (such as via tire nozzle 36) and/or onto brake pads (such as via brake nozzle 38 of FIG. 1), a lower degree of water processing may be required. As an example, a filter having a larger mesh size, or no filtering may be included in HVAC water line 224. In comparison, if the water harvested from the HVAC system 208 is used primarily for injecting into the cylinder (such as via water injector 32 of FIG. 1), a higher degree of water processing may be required. As an example, a filter having a smaller mesh size may be included in HVAC water line 224.

In some examples, a vehicle controller may actively operate the HVAC system 208 to generate condensed water even when the vehicle 100 is in a key-off state. HVAC system 208 may be operated based on inputs from the water generation system 202 (such as based on a water level in reservoir 268) so as to generate condensed water. In one example, water is generated by operating the HVAC system while the vehicle 100 is plugged into an external power source to recharge a system energy storage device. In another example, water is generated by operating the HVAC system while the vehicle is operating, such as by increasing the load on the condenser 210.

Water generation system 202 may also collect water condensed at engine 110. In particular, engine water collector 230 may be coupled to an engine block at a location from where water generated by engine cylinders 30 (due to cylinder combustion), charge air cooler 216 (due to boosted engine operation), and an EGR cooler (coupled to an EGR system 215) can be collected. The collector may be located below the CAC 216 (or at a location near a bottom surface of the CAC 216) so that water may be transferred from the CAC 216, and any other engine heat exchangers, to the engine water collector 230 using gravity. The engine collector 230 may be fluidly connected to one or more engine water processing components 232 including an engine water collection valve, a collection pump, a collection filter, etc. These components may be similar to those described earlier with reference to the HVAC system 208. The collected water is then delivered along engine water line 234 to the common reservoir 268. For example, water collected from the engine 110 may be initially stored in one of a plurality of water reservoirs 168, such as a water reservoir dedicated to collecting water from the engine system. The water may be treated and processed locally in the dedicated water reservoir before being transferred into common water reservoir 268 where the water collected from the engine system is merged with water collected from the other sources.

Water generation system 202 may also collect water condensed on the vehicle surface 206 as well as any water condensed in the vehicle cabin 202. For example, surface water collector 250 may be coupled to catch channels incorporated into one or more of the side of the windshield, the windshield column, the rubber sealing bordering the windshield, an outer edge of a side door, the space between the side door and the windshield column. At least some of these catch channels may include a front edge which protrudes outwardly from the external surface of the vehicle to enhance water catching. The catch channels prevent the water from going inside the vehicle cabin. Via these channels, water condensed on the surface of the vehicle, water from precipitation such as rain, or other water blown across the vehicle's surface by the force of wind resulting from the travel of the vehicle can be harvested at the surface water collector 250.

Similarly, cabin water collector 240 may be coupled to catch channels incorporated inside the vehicle cabin, such along an inner edge of a side door. Via these channels, water condensed on the inner surface of the vehicle, such as due to ambient humidity and from cabin occupants can be harvested at the cabin water collector 240.

Like the HVAC and engine water collectors 220, 230, the surface water collector 250 and the cabin water collector 240 may be fluidly connected to one or more water processing components 252 and 242, respectively, including corresponding water collection valves, collection pumps, collection filters, etc. These components may be similar to those described earlier with reference to the HVAC system 208 and engine system 110. The collected water is then delivered along surface water line 254 and cabin water line 244, respectively, to the common reservoir 268. For example, water collected from each of the vehicle surface 206 and the vehicle cabin 204 may be initially stored in distinct one of a plurality of water reservoirs 168. In the depicted example, water lines 244, 254 merge into a common water line 246 upstream of the reservoir although in other examples, the water lines may not merge. The water may be treated and processed locally in the dedicated water reservoirs before being transferred into common water reservoir 268 where the water collected from the engine system is merged with water collected from the other sources.

Water generation system 202 may also be capable of extracting water from ambient air. In particular, extractor 220 may be configured to draw in ambient air (such as from outside the vehicle or from within the vehicle cabin) through a filter 260 and direct cleaned air through an evaporator 217 and a condenser 218. In one example, the condenser and the evaporator may be coiled and nested together allowing for greater surface area of both the evaporator and the condenser and increasing the efficiency of the extractor 220. In particular, the coiled configuration may allow greater amounts of air to be moved through the extractor 220, thereby increasing the output of condensation. The extractor 220 may be operated using energy derived from an electric machine 219, which may be an electric motor, or from another energy source on-board the vehicle, such as a battery, or solar cells (such as battery 150 or solar cells 108 of FIG. 1). Condensation collected at the evaporator 217 is directed one or more water processing components 262 including water collection valves, collection pumps, collection filters, etc. These components may be similar to those described earlier with reference to the HVAC system 208 and engine system 110. The collected water is then delivered along extracted water line 264 to the common reservoir 268. For example, water collected by the extractor 220 may be initially stored in one of a plurality of water reservoirs 168. The water may be treated and processed locally in the dedicated water reservoirs before being transferred into common water reservoir 268 where the water collected from the engine system is merged with water collected from the other sources.

Based on the source of the water as well as the intended use, the one or more engine water processing components coupled to each water line 224, 234, 244, 254, 264 may be distinct. For example, additional filters may be included in the surface water line in anticipation of more dirt particles in the water. As another example, additional water heating elements may be present in the extracted water line in anticipation of the extracted water being at a lower temperature. As yet another example, additional water cooling elements may be present in the engine water line in anticipation of the extracted water being at a higher temperature.

Common reservoir 268 is fluidly connected to the various water lines (that is, water lines 224, 234, 244, 246, and 254) so as to collect water from the corresponding heat-exchangers and water sources. Common reservoir 268 may be located inside or outside of the vehicle cabin 204 and may include a water level sensor 266. The water level sensor 266 may be a float disposed within the reservoir which floats on accumulated water, or any other known sensor. In some embodiments, the common water reservoir 268 may also have a heating element configured to heat the accumulated water. When included, the heating element may be disposed within the water, or may be disposed in a wall of the reservoir. Water may also be pre-heated by one or more water processing components included in the water lines, such as via water heaters or heat exchangers coupled to the water lines. For example, water in engine line 234 may be preheated upon passage through or near engine 110.

Optionally, common water reservoir may include a temperature sensor 267 configured to provide a temperature of the accumulated water. When included, the temperature sensor 267 may be submerged in the water, may be in a wall of the reservoir, or may be part of the heating element. Together, the water level sensor 266 and the water temperature sensor 267 may relay information regarding water conditions to controller 190. For example, in freezing conditions, water temperature sensor 267 detects whether the water in reservoir 268 is frozen or available for dispensing. In some embodiments, an engine coolant passage (not shown) may be thermally coupled with common reservoir 268 to thaw frozen water. The level of water stored in reservoir 268, as identified by water level sensor 266, may be communicated to the vehicle operator and/or used to adjust vehicle operation. For example, a water gauge or indication on a vehicle instrument panel (not shown) may be used to communicate the level of water. If the level of water is higher than a threshold level, it may be inferred that there is sufficient water available for injection and spraying, and accordingly water injection may be enabled by the controller and/or or a particular water demand may be reprioritized to have a higher priority value. Else, if the level of water in the reservoir 268 is lower than the threshold level, it may be inferred that there is insufficient water available for injection, and therefore water injection may be disabled by the controller, or a particular water demand may be reprioritized to have a lower priority value.

Still other sensors may be coupled to the water reservoir 268. For example, the quality of the water collected in the reservoir 268 may be assessed based on the output of a conductivity sensor coupled to the water reservoir. In other examples, the water quality may be sensed by a capacitance sensor, optical sensor, turbidity sensor, density sensor, or some other type of water quality sensor. Water reservoir 268 may further include a drain 270 including a drain valve to drain water from the reservoir to a location outside the vehicle (e.g., onto the road), such as when a quality of the water is deemed to be lower than a threshold and not suitable for injection into the engine (e.g., due to high conductivity or high particulate matter content).

Based on the intended use, one or more processing elements may also be coupled to common reservoir 268. For example, a heating element may be included to heat or boil the accumulated water. The boiling of the water may be done to remove additional impurities. A cooling element may also be included to cool the water after it has been boiled. Additionally, the heating and cooling elements may be used to maintain the accumulated water at a given temperature or within a defined temperature range.

The common reservoir 268 may be coupled to an outlet valve 272. The outlet valve 272 may be a three way valve, a proportioning valve, or other valve configuration. The outlet valve 272 may be actuated to allow the water to flow out of the reservoir 268 to distinct locations based on the intended use and the priority value of the water demand. For example, water may be dispensed along a first dispensing line 276 that extends from the outlet valve 272 to a first set of injectors, sprayers, and nozzles, such as engine water injectors, tire spray nozzles, brake spray nozzles, etc. In still further examples, distinct dispensing lines may be coupled to distinct injectors and nozzles. A second dispensing line 274 may extend from the outlet valve 272 to a potable water reservoir coupled inside the vehicle, such as inside a passenger compartment of the vehicle cabin.

The water generation system 202 may also include a display 280 for displaying information about the water generation system 202 to a vehicle operator. Information may include data such as the water level in the reservoir(s), water temperature, whether the accumulated water has been purified, time elapsed since the accumulated water has been purified, water quality, etc. The display 280 may be located in a location visible to a user in the vehicle cabin 204.

Water generation system 202 may be communicatively coupled to vehicle controller 190. Based on input from the various sensors coupled to water generation system 202, as well as other sensors coupled to vehicle system 100 (such as those described with reference to FIG. 1), controller 190 may generate signals that are sent to the various actuators coupled to water generation system 202, as well as other actuators coupled to vehicle system 100 (such as those described with reference to FIG. 1). For example, based on input from an engine knock sensor, and further based on a water level in reservoir 268, the controller 190 may command an amount of water to be dispensed from the reservoir via outlet valve 272, the dispensed water then injected into the engine cylinder via a cylinder water injector. As another example, based on input from an exhaust particulate matter sensor or pressure sensor, and further based on a water level in reservoir 268, the controller 190 may command an amount of water to be dispensed from the reservoir via outlet valve 272, the dispensed water then sprayed onto vehicle tires and/or vehicle brakes via a tire spray nozzle and/or a brake spray nozzle. As further elaborated with reference to FIGS. 3-4, the controller may prioritize the dispensing of water based on the different water demands, the vehicle operating conditions, the water availability and the water quality. In doing so, water usage can be optimized.

In this way, the components of FIGS. 1-2 enable a vehicle system comprising: an engine including a cylinder head; a coolant system for circulating coolant through the cylinder head; a water harvesting system including an extractor for dehumidifying ambient air, a first collector for collecting condensate from a vehicle air conditioning unit, a second collector for collecting condensate from channels provided on a vehicle surface, and a reservoir for storing water received from each of the extractor, the first and the second collector; a water level sensor coupled to the reservoir; a tire nozzle for spraying water on a vehicle tire; a brake nozzle for spraying water on a brake pad; an engine nozzle for spraying water on the cylinder head; a vehicle speed sensor; and a controller with computer readable instructions that when executed cause the controller to: while vehicle speed is higher than a threshold, continuously spray water via the tire nozzle while intermittently spraying water via the engine nozzle responsive to cylinder head temperature, and not spraying water via the brake nozzle; and while vehicle speed is lower than the threshold, continuously spray water via the brake nozzle while intermittently spraying water via the engine nozzle responsive to cylinder head temperature, and not spraying water via the tire nozzle. In addition, the controller may include further instructions that when executed cause the controller to: predict a future water level in the reservoir on a current drive cycle based on current water usage rate and predicted vehicle operating conditions; compare a current water level in the reservoir, sensed via the water level sensor, to the predicted future water level; and vary a proportion of water sprayed via the tire nozzle or the brake nozzle relative to the engine nozzle based on the comparison. Turning now to FIG. 3, an example method 300 is shown for adjusting water injection into an engine, from a water generation system, responsive to various vehicle operating conditions including a current water availability relative to current water demands, as well as based on boost operation and water quality. The method enables vehicle performance to be improved by optimizing water usage especially when water levels are already low, or when water availability is predicted to be limited during a foreseeable driving cycle. Instructions for carrying out method 300 and the rest of the methods included herein may be executed by a controller based on instructions stored on a memory of the controller and in conjunction with signals received from sensors of the vehicle system, such as the sensors described above with reference to FIGS. 1-2. The controller may employ engine actuators of the engine system to adjust engine operation, according to the methods described below.

At 302, the method includes estimating and/or measuring vehicle operating conditions. These may include engine operating conditions such as engine speed and load, driver torque demand, ambient conditions (ambient temperature and humidity, barometric pressure, etc.), boost pressure, MAP, MAF, engine temperature, catalyst temperature, etc. In addition, vehicle operating conditions including vehicle speed, battery state of charge, vehicle emissions level, navigational input regarding a route from a point of origin to a point of destination (such as route information, weather conditions along route, traffic conditions along route, etc.) may be determined. The navigational input may be retrieved from a navigational system (e.g., global positioning system or GPS) communicatively coupled to the vehicle controller and also communicatively coupled to an internet network, such as via wireless communication.

At 304, the method includes determining the current level of water in a water reservoir of the water generation system. The current level of water may be directly measured by a fluid level sensor, or it may be estimated based on a history of water production and water consumption during the last drive cycle. In one example, the water level of a common or centralized water reservoir (such as reservoir 268 of FIG. 2) may be determined. In other examples, the water level in each distinct water reservoir of the water generation system may be determined.

At 306, the method includes predicting a future (or expected) level of water in the water reservoir of the water generation system during the foreseeable driving cycle. The foreseeable driving cycle may be defined based on destination information from the navigation system (e.g., GPS) of the vehicle, and/or based on previous vehicle driving history (e.g. typical driving routes, speeds, acceleration rates, power demands, etc.). The predicted level of water may be determined as a function of the initial water level in the water reservoir at the beginning of the vehicle drive cycle, and further based on a predicted rate of water generation on-board the vehicle relative to a predicted rate of water usage or consumption on-board the vehicle.

In one example, the predicted rate of water generation may be determined as a function of the running average of the collection rate of AC condensate over a last threshold number of miles (or minutes) of vehicle operation, as well as predicted cabin cooling demand. Likewise, the predicted rate of water production may be determined as a function of the running average of the collection rate of exhaust condensate and/or vehicle surface condensate over the last threshold number of miles (or minutes) of vehicle operation. The predicted rate of AC condensate collection (and predicted cabin cooling demand) and vehicle surface condensate collection may be further determined as a function of predicted ambient conditions. For example, expected ambient temperature and humidity may affect the collection rate of AC condensate and vehicle surface condensate (specifically, both collection rates may be predicted to increase as the ambient humidity increases). The predicted rate of exhaust condensate collection may be further determined as a function of predicted EGR usage over the drive cycle.

The predicted rate of water production may also be determined as a function of the expected ambient conditions along the predicted travel route, based on route and destination information from a navigation system (e.g., GPS) of the vehicle. The route and destination information may include, for example, internet based or broadcast weather forecasts (e.g., prediction of rain, snow, dry weather, etc.), predicted ambient temperature and humidity (which may affect predicted cabin cooling demand), terrain information for the travel route selected by the operator (e.g., expected terrain conditions, presence of uphill and downhill segments, expected road grade, etc.), as well as knowledge of typical driving patterns of the operator (that is, operator drive history which may include driver performance preferences).

The predicted rate of water consumption may be determined as a function of the running average of water usage (or drop in water level from the water reservoir) over the last threshold number of miles (or minutes) of vehicle operation. Water may have been injected during engine operation for one or more of addressing cylinder knock, providing a desired amount of engine dilution, and exhaust temperature control, engine temperature control, exhaust composition (e.g., exhaust PM level) control. The predicted rate of water usage on-board the vehicle may also be determined as function of ambient conditions including ambient temperature and humidity, the travel route selected by the operator (e.g., speed limits for different segments of the selected route, expected terrain conditions, location and number of uphill and downhill segments, road grade, frequency of acceleration versus steady cruise over the different segments, etc.) as well as operator drive history (e.g., whether the operator typically drives the vehicle in a performance mode, a fuel economy mode, or a sport mode, whether the operator is lead footed, whether the operator typically applies the brakes frequently, whether the operator tends to use cruise control or accelerates/decelerates frequently, etc.). The predicted rate of water consumption may be further determined as a function of typical previous driver aggressiveness (e.g., brake and accelerator usage patterns). As such, each of these parameters affects the speed-load regions the engine is predicted to operate in, which in turn affects expected knock frequency, expected EGR usage, and expected engine and exhaust temperatures.

Optionally, the current water level may be compared to the predicted water level. As an example, a difference between the current water level and the predicted water level may be determined. As another example, a rate of change in the water level (from the current level to the predicted level) over a duration or distance of vehicle operation over the foreseeable vehicle drive cycle may be determined. For example, it may be determined if the predicted water level is trending towards a decrease or increase from the current water level.

At 308, the method includes determining the different water demands of the vehicle. For example, based on the operating conditions, the vehicle controller may respective amounts of water to inject for engine knock control, for providing a desired level of engine dilution, for cylinder temperature control, for exhaust temperature or composition control, etc. Water may be injected into the engine responsive to knock wherein the charge cooling from the water provides knock relief, thereby reducing the reliance on spark retard for knock control. Likewise, water may be injected into the engine manifold to provide a desired engine dilution, reducing the need for EGR. Further, water may be injected into the engine responsive to elevated exhaust temperatures wherein the charge cooling from the water enables exhaust temperature control, reducing the need for enrichment of the air/fuel ratio. The controller may also determine other water demands such as the amount of water required to be sprayed onto a cylinder head for cylinder head temperature control, onto tires for tire particulate emissions control, or onto brake pads for brake particulate emissions control.

In one example, the controller may determine a first amount of water to inject into the engine responsive to knock, a second amount of water spray on the cylinder for cylinder head temperature control, a third amount of water to spray on the tires for PM control, and a fourth amount of water to spray on the brake pads for PM control. The controller may also determine the water quality required for each injection. For example, it may be determined that the first amount of water to be injected into the cylinders has to be of a higher than threshold water quality while the second amount of water to be sprayed onto the cylinder head or the third and fourth amounts to be sprayed onto the tires and brakes can be of a lower than threshold water quality.

At 310, the method includes assigning a priority value to each of the water demands (and the corresponding water injection amounts) based on the current water level and the predicted water level, and further based on the individual water demands, for example as elaborated according to the method of FIG. 4. The assigned priority values may be further based on the source of the water as well as operator input. The assigned priority values may also be determined based on the current water supply (e.g., in relation to the predicted future water supply). A first set of priority values may be assigned when the predicted water level is determined to be higher than the current water level, indicating that water is currently limited but more water is expected to be available in the future part of the drive cycle (or over the next several drive cycles). A second, different set of priority values may be assigned when the current water level is determined to be higher than the predicted water level, indicating that water is currently amply available but water availability is expected to become limited in the future part of the drive cycle (or water may run out in the next several drive cycles). The assigned priority values may also be adjusted as a function of vehicle operating conditions. For example, when water availability is limited, water may be first provided for cylinder temperature control before it is provided for PM control. Identification of, and presence in, an urban "particulate green zone" may cause the priority of brake and tires particulate suppression to be increased (e.g., to rise to the top priority) until the vehicle passes out of the green zone. This zone would be identified by GPS coordinates or by a locally broadcast signal based on local PM detectors. Even within water injection for PM control, the water injection order may be adjusted based on the age of the brake pads and the tires. For example, brake pads may release more PMs when they are initially installed. Thus, more water may be injected onto the brake location (relative to the tire location) when the brake pads' age is lower than a threshold. Then, as the brake pads age, more water may be injected onto the tire location relative to the brake location for PM control.

As yet another example, the assigning of priority values and the order of water injection may be adjusted based on tire temperature, which may be a function of road/asphalt temperature. As sun loading on a road increases, the road temperature may increase, increasing the temperature of tires driven on the road. Therefore as the ground temperature increases, more water may be injected onto the tire location relative to the brake location for PM control.

In a further example, the assigning of priority values may be affected by operator input. For example, if the operator provides input indicating that they wish to use the water for drinking purposes, more of the water may be directed towards processing to make potable water, and less water may be directed towards the brakes and the tires, or the cylinder head.

As still another example, the assigning of priority values may be affected by the source of the water, such as based on whether water was collected from an HVAC system, from ambient air, from a vehicle surface, etc. For example, if a larger portion (e.g., all) of the available water is collected from the vehicle surface, there may be dirt and particulate matter included therein, and so water usage for cylinder head cooling may be assigned a higher priority value as compared to water usage for PM control. In comparison, if a larger portion (e.g., all) of the available water is collected from the HVAC system, water usage for cylinder head cooling may be assigned a lower priority value as compared to water usage for PM control.

The assigning of priority values enables the fuel economy and performance benefits of the limited water supply to be maximized by using the water during conditions that create a higher efficiency benefit per unit of water while stopping or reducing water usage during conditions that create a lower efficiency benefit per unit of water. The different priority values may affect the order in which the different amounts of water are dispensed in the vehicle.

In one example, assigning priority values includes, when the current water level is higher than the predicted water level, assigning a first, highest priority value to the first amount of water to be injected responsive to knock, followed by a second, lower priority value to the third and fourth amounts of water to be injected responsive to PM levels, and only injecting the second amount of water responsive to engine temperature if the cooling system is not able to address the temperature (such as due to cooling system degradation). This is due to the relatively higher water consumption rate when water is used for cylinder temperature control. As another example, assigning priority values includes, when the predicted water level is higher than the current water level, assigning a first, highest priority value to the second amount of water to be injected responsive to engine temperature, followed by a second, lower priority value to the third and fourth amounts of water to be injected responsive to PM levels, followed by a third, lowest priority value to the first amount of water to be injected responsive to engine knock.

Assigning priority values may additionally or alternatively include adjusting water level thresholds responsive to which water is injected for knock control, dilution control, PM control, and temperature control. As one example, water may be injected for each of knock control, PM control, and engine temperature control when the water level in the water reservoir is above a first threshold. Water may be injected for each of knock control and temperature control but not PM control when the water level in the water reservoir is above a second threshold, lower than the first threshold. Water may be injected for only knock control or only for temperature control or dilution control when the water level in the water reservoir is above a third threshold, lower than each of the first and second threshold. As the current water level changes with respect to the predicted water level, the thresholds may be adjusted. For example, the second and third thresholds may be adjusted with reference to the first threshold.

As an example, as the predicted water level drops relative to the current water level, a water shortage may be anticipated. To conserve water primarily for the highest priority water use (such as for knock control when the cooling system is not degraded, engine temperature control when the cooling system is degraded, or PM control when in a particulate green zone, while maintaining the first threshold (or lowering the first threshold), one or more of the second and third thresholds may be raised. A rate of raising the second and/or third threshold may be based on the rate of change in water level from the current level to the predicted level. For example, when the predicted water level is expected to drop relative to the current water level at a faster rate (faster rate of depletion), the rate of increasing the second and third thresholds may also correspondingly increase.

As another example, as the predicted water level rises relative to the current water level, a water surplus may be anticipated. To enhance water usage, while maintaining the first threshold (or lowering the first threshold), one or more of the second and third thresholds may be lowered. A rate of lowering the second and/or third threshold may be based on the rate of change in water level from the current level to the predicted level. For example, when the predicted water level is expected to rise relative to the current water level at a faster rate (faster rate of regeneration), the rate of decreasing the second and third thresholds may also correspondingly increase.

At 312, optionally, the method includes further adjusting the assigned priority values based on an estimated quality of water in the reservoir. This may include determining whether to enable or disable water delivery, as well as adjusting the water injection priority values based on the estimated water quality. As such, the nature of contaminants present in the water, as well as the degree of contamination may vary widely based on the water source, as well as based on a percentage of the total water in the reservoir that was generated or harvested on-board the vehicle from a contaminated sourced. For example, water collected from a vehicle surface may have a higher degree of contamination than water collected from an HVAC system. The quality of the water in the water reservoir may be estimated based on the output of a water quality sensor coupled to the water reservoir, the water quality estimate based on a conductivity value or ionic strength of the water (such as sensed via a conductivity sensor). In alternate examples, the quality of the water may be estimated based on an ionic strength of the water, a particle matter content, a turbidity sensor, a density sensor, a refraction index, etc.

As an example, the estimated water quality (e.g., the index value or rating number or conductivity value) may be compared to a threshold which depends on the water quality sensor being used. For example, a lower reading on a turbidity sensor may be given a high water quality index value, and turbidity readings of less than 5 NTU may correspond to water quality index values higher than the threshold. The threshold may correspond to a minimum water quality level required to enable water usage without compromising vehicle performance or engine combustion characteristics. In some examples, a common threshold may be applied for all water injection events. In other examples, distinct thresholds may be applied for water injection responsive to knock as compared to water delivery for engine temperature control, or for PM control because deposit forming tendency may depend on component temperatures or other factors which are highly correlated to the various usage conditions. In some examples, the estimated water quality may be compared to each of a lower threshold below which water injection may always be disabled, and an upper threshold above which water injection may always be enabled. In between the upper and lower threshold, water injection may be limited, for example, an operating window where water injection is permissible may be limited or varied, which may affect the assigned priority value of water injection. For example, when the water quality is lower, water delivery responsive to PM levels may be enabled in a broader engine speed-load regions including regions where elevated engine temperatures are anticipated (even before they are actually detected).

At 314, the method includes scheduling the water usage based on the assigned priority values with the water demand having the highest priority value being met first. In particular, the controller may inject or spray the determined amounts of water corresponding to the different water demands to their corresponding location in an order based on the assigned priority values. Based on the water demand amount and location, the corresponding injector or spray nozzle may be actuated. For example, the controller may send a pulse-width signal to the corresponding water injector or spray nozzle to deliver the selected amount of water into the selected location while maintaining the remaining water injectors disabled. In one example, when water is to be injected for knock control, the controller may actuate a direct water injector coupled to an engine cylinder and send a pulse-width signal corresponding to the knock control amount to the direct water injector. In another example, when water is to be injected for engine temperature control, the controller may actuate a cylinder head water nozzle coupled to an engine cylinder head and send a pulse-width signal corresponding to the temperature control amount to the water nozzle.

In this way, the fuel economy and performance benefits of water usage on a vehicle can be maximized, particularly when operating with a limited water supply generated by an on-board water generating and harvesting system. By assigning a priority value to water usage amounts applied for distinct operating conditions, and delivering the amount of water for each usage condition based on its priority value when the water supply is limited, the efficiency benefit per unit of water injected can be substantially increased. By stopping or reducing or delaying the use of water during operating conditions having a lower efficiency benefit, vehicle performance can be maintained elevated until the water reservoir becomes empty. By also varying the selection of the water delivery amount based on the estimated quality of water available in a water reservoir, water usage benefits can be extended over a wider range of vehicle operating conditions, even when the water supply is of poor quality.

Turning now to FIG. 4, an example method 400 of adjusting an order of water usage based on vehicle operating conditions is shown. The method may include assigning distinct priority values to different water demands based on the nature of the usage, the amount of the usage, as well as other criteria such as water quality and water availability. In one example, the method of FIG. 4 may be performed as part of the method of FIG. 3, such as at 310.

At 402, the method includes estimating vehicle component temperature(s). For example, an engine temperature may be inferred based on engine coolant temperature (ECT) and/or cylinder head temperature (CHT), such as via an ECT sensor or a CHT sensor. Other components whose temperature may be estimated include in-cylinder temperature, piston bowl temperature, intake valve temperature.

At 404, the method includes estimating vehicle PM emissions based on vehicle operating conditions including engine speed-load conditions as well as components temperatures. For example, overall PM emissions from the vehicle may be estimated. In addition, PM emissions from individual components or distinct vehicle locations, such as the engine, exhaust pipe, vehicle tires, brake pads, etc., may be estimated or inferred. In one example, tire particulate emissions may be inferred based on vehicle speed, and vehicle speed in combination with lateral acceleration or steering angle, and ABS-measured wheel slip amount. As another example, brake particulate emissions may be inferred based on longitudinal deceleration, applied brake pedal force, scheduled friction brake torque (versus regenerative braking). The preceding estimates may be improved by combining the above with vehicle speed and road grade estimate.

At 406, the method includes determining if the engine cooling system is degraded. In one example, cooling system degradation may be determined based on the results of a cooling system diagnostic routine. Cooling system degradation may occur due to coolant leakage or due to degradation of a coolant pump or valve. If the cooling system is degraded, in the event of elevated engine temperatures, such as when the cylinder head temperature exceeds a threshold, there may be a delay before round-robin fuel injector cuts can limit the temperature increase. Therein, responsive to the rise in temperature, fuel injectors may be sequentially deactivated to disable cylinder combustion and thereby disable the temperature increase. However, due to the degraded cooling system not being able to provide any engine cooling, cylinder head temperature may rise significantly over a threshold temperature before the fuel injector cuts are able to curb the temperature increase. The overheating can degrade engine components as well as impact engine performance. To address this, water may be sprayed onto the cylinder head to reduce the rate of temperature rise so that by the time the fuel injector cuts occur, the temperature rise is limited.

If the cooling system is not degraded, at 416, the method includes assigning a lower priority value to the water demand for cylinder head temperature control. The method then moves to 418. If the cooling system is degraded, then at 408, the method includes assigning a highest priority value to the water demand (or water usage) for cylinder head temperature control. The water demand for cylinder head temperature control may include an amount of water to be sprayed on the cylinder head, which may be determined as a function of the (absolute) cylinder head temperature and/or the rate of rise of cylinder head temperature, as well as a corresponding pulse-width of water injection to be commanded to a cylinder head water spray nozzle. By assigning the highest priority value to the water demand for cylinder head temperature control responsive to cooling system degradation, engine overheating can be avoided.

Next at 410, it may be determined if the fuel injectors have been deactivated for temperature control. That is, the round-robin fuel injector cuts may be confirmed. Once the fuel injector cuts are enabled, further water spraying on the cylinder head for temperature control may not be required. Thus, if the fuel injectors are deactivated, then at 414, the water demand for cylinder head temperature control may be reassigned a lower priority value. Else at 412, the higher priority value is maintained until the fuel injectors are disabled. The method then moves to 418.

At 418, after assigning a priority value to the water demand for engine temperature control, the method includes estimating a vehicle PM level and comparing it to a non-zero threshold to determine if the vehicle PM emissions are higher than the threshold. If the PM level is not higher than the threshold, then at 428, the method includes assigning a lower priority value to a water demand for PM control. The method then moves to 430.

Else, if the vehicle PM emissions are higher than the threshold, at 420, the method includes assigning a higher priority value to the water demand for PM control. Water may be sprayed onto or injected into one or more vehicle locations to reduce PM emissions. For example, water may be injected into an exhaust manifold (or exhaust passage). As another example, water may be sprayed onto vehicle tires. By spraying water over the tires and/or into the air at a location where particulates are released from the tire during vehicle motion, the released particulates may coagulate and fall to the ground. The water demand for PM control may include an amount of water to be delivered, which may be determined as a function of the (absolute) vehicle PM level and/or the rate of PM levels, as well as a corresponding pulse-width of water injection to be commanded to one or more of an exhaust manifold water injector and a tire water spray nozzle. By assigning the highest priority value to the water demand for PM control responsive to elevated vehicle PM levels, vehicle emissions may be better controlled.

When the highest priority is assigned to the water usage for PM control, it may be further determined at 422 if any braking events are expected in the current drive cycle. For example, based on navigational input from a GPS, it may be determined if the vehicle is expected to enter a zone with the lower speed limit or whether the vehicle is expected to decelerate, such as on a downhill trajectory. If braking events are expected, then release of brake particulates may be anticipated, the brake particulates adding to the vehicle's PM emissions. Accordingly, if braking events are expected in the drive cycle, then at 424, the method further includes spraying water onto the brake pad location before spraying water onto the tire location. For example, a larger proportion of the total water to be used for PM control may be directed to the brake nozzle over the tire nozzle. In one example, the controller may command a larger pulse-width to the water spray nozzle coupled to the brake pad location versus the nozzle coupled to the tire location. By spraying water over the brake pads and/or into the air at a location where particulates are released from the brakes during vehicle braking events, the released particulates may coagulate and fall to the ground.

If braking events are not expected in the drive cycle, then at 426, the method further includes spraying water onto the tire location before spraying water onto the brake location. For example, a larger proportion of the total water to be used for PM control may be directed to the tire nozzle over the brake nozzle. In one example, the controller may command a larger pulse-width to the water spray nozzle coupled to the tire location versus the nozzle coupled to the brake pad location. By spraying water over the tires and/or into the air at a location where particulates are released from the tires during vehicle motion, the released particulates may coagulate and fall to the ground. The method then moves to 430.

At 430, the method includes estimating the water quality. For example, the water quality may be measured via a sensor (such as a turbidity sensor, ionic strength sensor, etc.) and it may be determined if the measured quality is lower than a non-zero threshold. If the water quality is determined to be poor, then at 432, the method includes assigning a lower priority value to water demanded for engine injection. For example, water to be injected into an engine cylinder for knock control may be assigned a lower priority value. By assigning a lower priority value to water that is required for engine injection when the water quality is low, adverse combustion events and engine component degradation triggered by poor water quality may be averted. If the water quality is not poor, such as when the measured water quality is higher than the threshold, at 434, the method includes assigning a higher priority value to water demanded for engine injection. For example, water to be injected into an engine cylinder for knock control may be assigned a higher priority value. The water demand for knock control may include an amount of water to be sprayed into an engine cylinder, which may be determined as a function of the output of an engine knock sensor or based on an engine speed-load region. In addition, the water demand may include a corresponding pulse-width of water injection to be commanded to a cylinder water injector. By assigning the highest priority value to the water demand for knock control when the water quality is sufficiently high, knock can be mitigated, improving engine fuel economy and performance.

In one example, based on vehicle operating conditions, a vehicle controller may determine water injection amounts for each of knock control, engine temperature control, and vehicle PM control. Based on the current water level and the predicted water levels over the drive cycle, the controller may assign a priority value to each of the respective uses of water, and determine the corresponding amounts to be used. The selected total amount may then be injected. As one example, when the current water level is low and/or the water level is medium but predicted to fall to low over the drive cycle, the water injection amount for knock control may be given the highest priority value and sufficient water may be injected to ensure knock control in order to achieve the highest engine efficiency benefit per unit of water. In this case insufficient water may be available for meeting the PM emissions, and PM emissions may be addressed by other approaches. In another case, if the current and predicted water level is low, and the engine cooling system is degraded, then the water injection amount for temperature control may be given the highest priority value while knock may be addressed using spark retard. As a third example, when the current water level is medium and/or the water level is predicted to rise from a low to medium level over the drive cycle, and the engine cooling system is not degraded, the water injection amounts for knock control and PM control may both be given high priority and sufficient water may be injected to ensure both knock control and to reduce PM emissions. In addition, use of maximum air conditioning usage (such as responsive to an operator request for cabin cooling) may lead to increased prediction of water-from-air generation. Similarly, rain detection and connected vehicle rain prediction may lead to increased prediction of recovery of water from roof channels.

Figure 5:
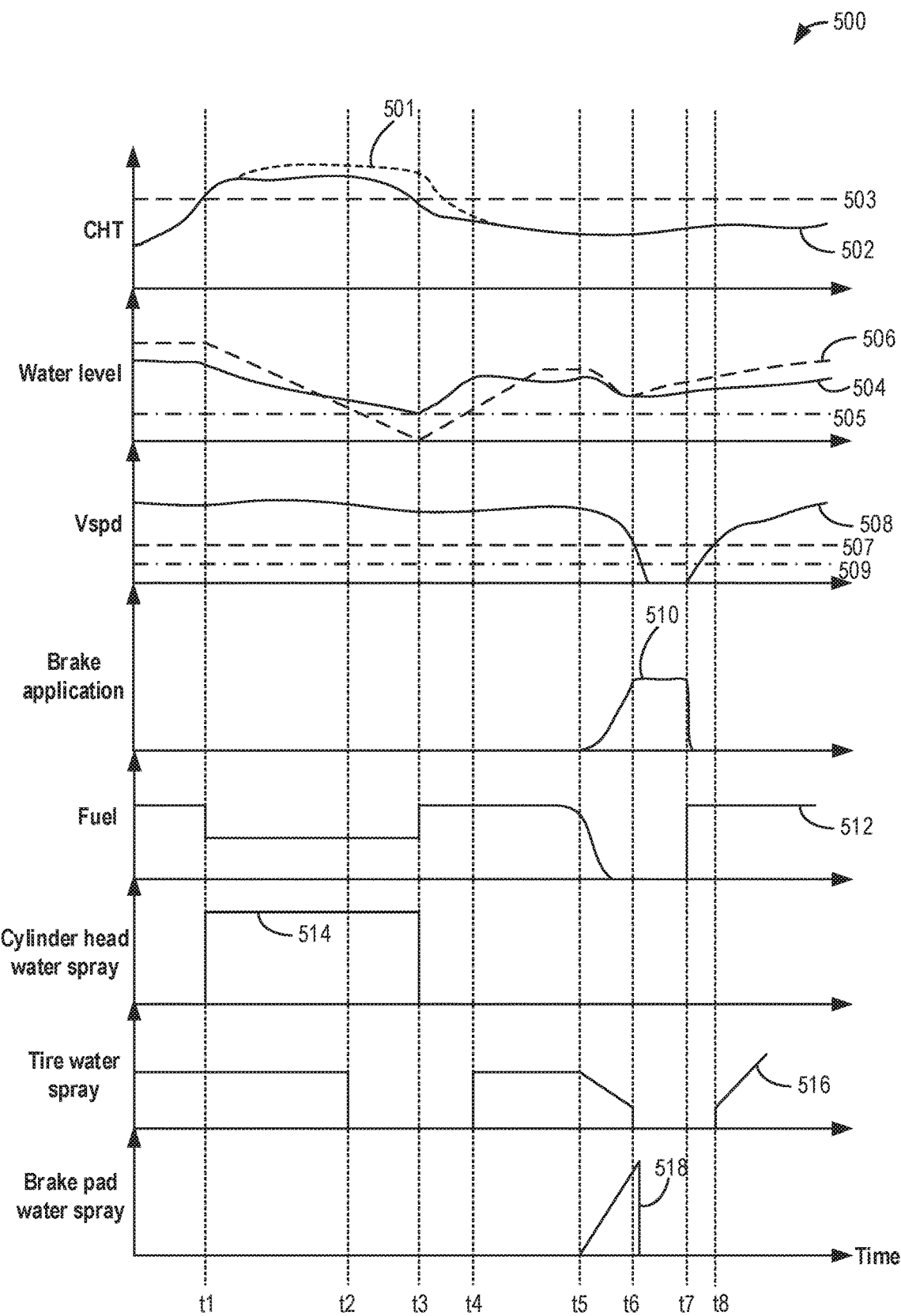
FIG. 5 shows an example water injection adjustment to maximize water usage when the water supply is limited.

Turning now to FIG. 5, an example adjusting of an order of water usage is shown at map 500. Map 500 depicts cylinder head temperature (CHT, indicative of engine temperature) at plot 502 relative to a threshold temperature 503. Above the threshold temperature, fail-safe engine cooling may be triggered wherein water is sprayed on the cylinder head. CHT exceeding the threshold temperature is indicative of engine coolant system degradation (that is, engine coolant is not able to cool the engine). An actual water level in a water reservoir on-board the vehicle is shown at plot 504 (solid line) relative to a predicted water level (plot 506, dashed line). The predicted water level is computed by a vehicle controller based on a current rate of water usage and engine operating conditions such as engine temperature. The actual and predicted water level is shown in relation to a threshold water level 505 below which water usage may be disabled. Plot 508 depicts a vehicle speed (vspd) relative to a tire threshold 507 and a brake threshold 509. Herein vehicle speed is used to infer PM release from the tires and brake pads. When vehicle speed is above the tire threshold 507, tire PMs may be generated which are addressed by spraying water onto vehicle tires. When vehicle speed is lowered below the brake threshold 507, brake PMs may be generated which are addressed by spraying water onto vehicle brake pads. Friction brake application is shown at plot 510. Application of the friction brakes results in a force being applied to the brake rotor and brake pads, which releases PMs. Engine fuel usage is shown at plot 512. Spraying of water onto a cylinder head via a cylinder head nozzle is shown at plot 514, spraying of water onto the tire via a tire nozzle is shown at plot 516, and spraying of water onto brake pads and rotors via a brake nozzle is shown at plot 518. All plots are shown over time along the x-axis.

Prior to t1, the engine is not overheated, as indicated by CHT (plot 502) being lower than threshold 503. Therefore water is not injected onto the cylinder head (plot 514).

However, the CHT is slowly rising. Due to the vehicle speed (plot 508) being higher than tire threshold 507, tire PMs are expected, and therefore water is sprayed onto the tires (plot 516). Brakes are not applied (plot 510) and therefore brake PMs are not anticipated, and no water is sprayed onto the brake pads (plot 518). The engine is operating fueled at this time with engine torque being used to propel the vehicle. The rate of water generation on-board the vehicle is substantially equal to the rate of water usage, and as a result, the water level in a water reservoir on-board the vehicle remains substantially the same (plot 504) even as water is sprayed into the tires. The predicted water level (plot 506) is about the same as the actual water level.

At t1, CHT exceeds threshold 503 which triggers the spraying of water onto the cylinder head (plot 514). In addition, to further curb the rapid rate of engine temperature rise, round robin fuel injector cuts are initiated (plot 512). As a result of the combination of fuel cuts and water spraying, the CHT drops below threshold 503 around t3. If only fuel injector cuts were used and water were not sprayed onto the cylinder head, CHT may have remained above threshold 503 for a significant duration (as shown by dashed segment 501).

Between t1 and t3, the predicted water level in the reservoir drops at a faster rate than the actual level. For example, the vehicle controller may project that based on the CHT and vehicle speed, water injection may be supported for a short duration (e.g., between 5-10 minutes) before water in the reservoir becomes almost depleted. At t3, responsive to the predicted water level falling below the current water level, and also below water usage threshold 505, water usage is limited to cylinder temperature control. Herein, even though the vehicle speed is above the tire threshold, spraying of water onto the tires is stopped. Also at t3, responsive to CHT falling below the threshold, spraying of water onto the cylinder head is disabled. In addition, the fuel injector cuts are also disabled, allowing nominal fueling to resume.

As a result of the limited water injection, the actual and predicted water level in the reservoir starts to rise after t3. Between t3 and t4, no water is sprayed at any of the cylinder head, tire, or brake locations. At t4, responsive to the actual and predicted water levels rising above threshold 505, spraying of water onto the tires is resumed since the vehicle speed remains above tire threshold 507.

At t5, friction brakes are applied by a vehicle operator causing the vehicle speed to drop. Fueling is disabled responsive to the drop in torque demand. Responsive to application of the brakes, water is sprayed onto the brake pads and rotors. When the vehicle speed falls below tire threshold 507, at t6, spraying of water onto the tires is disabled. As the vehicle speed drops further and falls below brake threshold 509, shortly after t6, spraying of water onto the brake pads and rotors is also disabled. As water usage drops, the actual and predicted water levels at the reservoir start to rise.

At t7, the brakes are released and the vehicle speed starts to rise again. The CHT remains below the threshold and so cylinder head fail-safe cooling is not triggered. At t8, the vehicle speed exceeds the tire threshold 507. As a result, water spraying onto the tires is enabled so as to limit tire PMs. In this way, water may be harvested on-board a vehicle and usage of the harvested water for addressing various vehicle and engine operating constraints can be maximized. For example, water usage for engine knock control, vehicle emissions control, and engine temperature control can be maximized. The technical effect of selecting an order to where to inject or spray water based on a current water level relative to predicted future water availability on-board the vehicle, as well as based on whether a cooling system is degraded or not is that water usage can be reprioritized. This allows water usage to be restricted to conditions where the efficiency benefits of water usage are higher when water is limited. In addition, water usage for conditions where larger rates of water consumption are expected (such as during engine temperature control) can be limited to conditions where other methods over engine temperature control are not immediately available, such as when the cooling system is degraded and fuel injector cut-off incurs a delay. Overall, the use of water available on a vehicle can be extended, even when water availability is limited and/or water quality is low. In addition, by using water for vehicle temperature and emissions control, reliance on other fuel inefficient approaches such as enrichment and spark retard is reduced, providing fuel economy, emissions, and vehicle performance benefits.

One example method for a vehicle comprises: storing water generated on-board the vehicle in a reservoir; and varying an order of delivering water from the reservoir to at least a cylinder head, vehicle tires, and vehicle brake pads based on a water level in the reservoir and an exhaust particulate level. In the preceding example, additionally or optionally, the varying is further based on an indication of engine cooling system degradation, the indication including a higher than threshold cylinder head temperature for longer than a threshold duration. In any or all of the preceding examples, additionally or optionally, the varying includes: responsive to the indication of engine cooling system degradation, spraying water via a nozzle onto the cylinder head before spraying water via another nozzle onto the vehicle brake pads and/or vehicle tires; and responsive to no indication of engine cooling system degradation, spraying water via the nozzle onto the cylinder head after spraying water via another nozzle onto the vehicle brake pads and vehicle tires. In any or all of the preceding examples, additionally or optionally, the method further comprises, responsive to the indication of engine cooling system degradation, spraying water via the nozzle while concurrently disabling cylinder fuel injection until the cylinder head temperature is below the threshold. In any or all of the preceding examples, additionally or optionally, the method further comprises adjusting a ratio of water sprayed onto the vehicle brake pads relative to the vehicle tires based on road temperature, age of the brake pads, and vehicle speed, the adjusting including spraying a higher proportion of the water onto the brake pads relative the vehicle tires when the age of the brake pads is lower than a threshold age, the road temperature is lower than a threshold temperature, or a vehicle speed is lower than a threshold speed, and spraying the higher proportion of the water onto the vehicle tires relative the brake pads when the age of the brake pads is higher than the threshold age, the road temperature is higher than the threshold temperature, or the vehicle speed is higher than the threshold speed. In any or all of the preceding examples, additionally or optionally, the method further comprises processing at least a portion of the stored water to generate potable water for use by a vehicle operator on-board the vehicle. In any or all of the preceding examples, additionally or optionally, the varying is further based on navigational input from a navigation system communicatively coupled to a controller of the vehicle, and operator input from a vehicle operator, the varying including: responsive to the navigational input indicating entry of the vehicle in a low emissions rated zone, spraying water only onto the vehicle brake pads and vehicle tires; and responsive to the operator input indicating operator request for potable water, disabling spraying of water onto each of the vehicle brake pads, the vehicle tires, and the cylinder head, while processing all of the stored water to generate potable water. In any or all of the preceding examples, additionally or optionally, the method further comprises generating water on-board the vehicle via a water generator, the generator including a heat exchanger, and collecting water, generated as condensate, from one or more of a vehicle air conditioning system, a fuel cell, and a vehicle surface, wherein storing the water generated on-board the vehicle includes storing a combination of the water generated by the water generator and the collected water. In any or all of the preceding examples, additionally or optionally, the method further comprises processing the collected water for delivery, the processing varied as a function of a source of the collected water, the collected water processed via a higher degree of filtration when the collected water is generated as condensate from the vehicle surface, the collected water processed via a lower degree of filtration when the collected water is generated as condensate from the vehicle air conditioning system or the fuel cell.

Another example method for a vehicle comprises: harvesting water on-board a vehicle from one or more of an air conditioning unit, a fuel cell, a vehicle surface, and an ambient air water extractor, the harvested water stored on the vehicle in a reservoir; comparing a current water level in the reservoir to a predicted water level in the reservoir over a drive cycle of the vehicle and to each of a plurality of threshold water levels; and spraying water from the reservoir onto a cylinder head, a vehicle tire, and a brake pad, an order and proportion of the spraying water based on the comparison, and further based on vehicle speed. In the preceding example, additionally or optionally, the spraying includes: in response to vehicle speed being higher than a threshold speed, spraying water on the vehicle tire and then on the cylinder head while disabling spraying on the brake pad, the proportion of water sprayed on the cylinder head increased as cylinder head temperature exceeds a threshold temperature, the proportion of water sprayed on the tire increased as the vehicle speeds exceeds the threshold speed; and in response to vehicle speed being lower than the threshold speed, spraying water on the brake pad and then on the cylinder head, the proportion of water sprayed on the cylinder head increased as cylinder head temperature exceeds a threshold temperature, the proportion of water sprayed on the tire increased as the vehicle speeds exceeds the threshold speed. In any or all of the preceding examples, additionally or optionally, each of the threshold speed and threshold temperature is adjusted as a function of estimated water quality, each of the threshold speed and threshold temperature lowered as the estimated water quality decreases. In any or all of the preceding examples, additionally or optionally, the spraying includes: in response to the predicted water level exceeding the current water level, spraying water on the vehicle tire before spraying water on the cylinder head or the brake pad; and in response to the predicted water level falling below the current water level, spraying water on the cylinder before spraying water on the brake pad or the vehicle tire. In any or all of the preceding examples, additionally or optionally, the spraying includes: in response to the current water level being higher than a first threshold, spraying water on the cylinder head, then on the vehicle tire location, and then on the brake pad location; in response to the water level being higher than a second threshold but lower than the first threshold, spraying water on the cylinder head, and then on the vehicle tire location, but not on the brake pad location; in response the water level being higher than a third threshold but lower than the second threshold, spraying water on the vehicle tire location and the brake pad location, but not on the cylinder head; and in response to the water level being lower than each of the first, second, and third threshold, temporarily disabling the spraying of water. In any or all of the preceding examples, additionally or optionally, the order of the spraying is further based on each of brake pad age, tire temperature, cylinder head temperature, water quality, operator input, and navigational input. In any or all of the preceding examples, additionally or optionally, the spraying includes spraying water first on the cylinder head, then on the vehicle tire location and the brake pad location responsive to higher than threshold cylinder head temperature or lower than threshold water quality; spraying water first on the brake pad location, and then on the vehicle tire location responsive to higher than threshold brake pad age; spraying water first on the vehicle tire location, and then on the brake pad location responsive to higher than threshold tire temperature. In any or all of the preceding examples, additionally or optionally, the method further comprises, responsive to the operator input indicating a request for potable water, disabling the spraying and processing the water in the reservoir via a distiller. In any or all of the preceding examples, additionally or optionally, the method further comprises, responsive to the navigational input indicating entry of the vehicle in a low emissions zone, spraying the water only on the tire location and the brake pad location.

An example vehicle system comprises: an engine including a cylinder head; a coolant system for circulating coolant through the cylinder head; a water harvesting system including an extractor for dehumidifying ambient air, a first collector for collecting condensate from a vehicle air conditioning unit, a second collector for collecting condensate from channels provided on a vehicle surface, and a reservoir for storing water received from each of the extractor, the first and the second collector; a water level sensor coupled to the reservoir; a tire nozzle for spraying water on a vehicle tire; a brake nozzle for spraying water on a brake pad; an engine nozzle for spraying water on the cylinder head; a vehicle speed sensor; and a controller with computer readable instructions that when executed cause the controller to: while vehicle speed is higher than a threshold, continuously spray water via the tire nozzle while intermittently spraying water via the engine nozzle responsive to cylinder head temperature, and not spraying water via the brake nozzle; and while vehicle speed is lower than the threshold, continuously spray water via the brake nozzle while intermittently spraying water via the engine nozzle responsive to cylinder head temperature, and not spraying water via the tire nozzle. In the preceding example, additionally or optionally, the controller includes further instructions that when executed cause the controller to predict a future water level in the reservoir on a current drive cycle based on current water usage rate and predicted vehicle operating conditions; compare a current water level in the reservoir, sensed via the water level sensor, to the predicted future water level; and vary a proportion of water sprayed via the tire nozzle or the brake nozzle relative to the engine nozzle based on the comparison.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
storing water generated on-board the vehicle in a reservoir;
varying an order of delivering water from the reservoir to at least a cylinder head, vehicle tires, and vehicle brake pads based on a water level in the reservoir and an exhaust particulate level; and
adjusting a ratio of water sprayed onto the vehicle brake pads relative to the vehicle tires based on road temperature, age of the brake pads, and vehicle speed.

2. The method of claim 1, wherein the varying is further based on an indication of engine cooling system degradation, the indication including a higher than threshold cylinder head temperature for longer than a threshold duration.

3. The method of claim 2, wherein the varying includes:
responsive to the indication of engine cooling system degradation, spraying water via a nozzle onto the cylinder head before spraying water via another nozzle onto the vehicle brake pads and/or vehicle tires; and
responsive to no indication of engine cooling system degradation, spraying water via the nozzle onto the cylinder head after spraying water via another nozzle onto the vehicle brake pads and vehicle tires.

4. The method of claim 3, further comprising, responsive to the indication of engine cooling system degradation, spraying water via the nozzle while concurrently disabling cylinder fuel injection until the cylinder head temperature is below the threshold.

5. The method of claim 3, wherein the adjusting includes spraying a higher proportion of the water onto the brake pads relative the vehicle tires when the age of the brake pads is lower than a threshold age, the road temperature is lower than a threshold temperature, or a vehicle speed is lower than a threshold speed, and spraying the higher proportion of the water onto the vehicle tires relative the brake pads when the age of the brake pads is higher than the threshold age, the road temperature is higher than the threshold temperature, or the vehicle speed is higher than the threshold speed.

6. The method of claim 3, further comprising, processing at least a portion of the stored water to generate potable water for use by a vehicle operator on-board the vehicle.

7. The method of claim 6, wherein the varying is further based on navigational input from a navigation system communicatively coupled to a controller of the vehicle, and operator input from a vehicle operator, the varying including:
responsive to the navigational input indicating entry of the vehicle in a low emissions rated zone, spraying water only onto the vehicle brake pads and vehicle tires; and
responsive to the operator input indicating operator request for potable water, disabling spraying of water onto each of the vehicle brake pads, the vehicle tires, and the cylinder head, while processing all of the stored water to generate potable water.

8. The method of claim 1, further comprising, generating water on-board the vehicle via a water generator, the generator including a heat exchanger, and collecting water, generated as condensate, from one or more of a vehicle air conditioning system, a fuel cell, and a vehicle surface, wherein storing the water generated on-board the vehicle includes storing a combination of the water generated by the water generator and the collected water.

9. The method of claim 8, further comprising, processing the collected water for delivery, the processing varied as a function of a source of the collected water, the collected water processed via a higher degree of filtration when the collected water is generated as condensate from the vehicle surface, the collected water processed via a lower degree of filtration when the collected water is generated as condensate from the vehicle air conditioning system or the fuel cell.

10. A method for a vehicle, comprising:
harvesting water on-board a vehicle from one or more of an air conditioning unit, a fuel cell, a vehicle surface, and an ambient air water extractor, the harvested water stored on the vehicle in a reservoir;
comparing a current water level in the reservoir to a predicted water level in the reservoir over a drive cycle of the vehicle and to each of a plurality of threshold water levels; and
spraying water from the reservoir onto a cylinder head, a vehicle tire, and a brake pad, an order and proportion of the spraying water based on the comparison, and further based on vehicle speed,
wherein the order of the spraying is further based on each of brake pad age, tire temperature, cylinder head temperature, water quality, operator input, and navigational input.

11. The method of claim 10, wherein the spraying includes:
in response to vehicle speed being higher than a threshold speed, spraying water on the vehicle tire and then on the cylinder head while disabling spraying on the brake pad, the proportion of water sprayed on the cylinder head increased as cylinder head temperature exceeds a threshold temperature, the proportion of water sprayed on the tire increased as the vehicle speeds exceeds the threshold speed; and
in response to vehicle speed being lower than the threshold speed, spraying water on the brake pad and then on the cylinder head, the proportion of water sprayed on the cylinder head increased as cylinder head temperature exceeds a threshold temperature, the proportion of water sprayed on the tire increased as the vehicle speeds exceeds the threshold speed.

12. The method of claim 11, wherein each of the threshold speed and threshold temperature is adjusted as a function of the water quality, each of the threshold speed and threshold temperature lowered as the water quality decreases.

13. The method of claim 10, wherein the spraying includes:
in response to the predicted water level exceeding the current water level, spraying water on the vehicle tire before spraying water on the cylinder head or the brake pad; and
in response to the predicted water level falling below the current water level, spraying water on the cylinder before spraying water on the brake pad or the vehicle tire.

14. The method of claim 10, wherein the spraying includes:
in response to the current water level being higher than a first threshold, spraying water on the cylinder head, then on a location of the vehicle tire, and then on another location of the brake pad;
in response to the water level being higher than a second threshold but lower than the first threshold, spraying water on the cylinder head, and then on the vehicle tire location, but not on the brake pad location;
in response the water level being higher than a third threshold but lower than the second threshold, spraying water on the vehicle tire location and the brake pad location, but not on the cylinder head; and
in response to the water level being lower than each of the first, second, and third threshold, temporarily disabling the spraying of water.

15. The method of claim 14, wherein the spraying includes:
spraying water first on the cylinder head, then on the vehicle tire location and the brake pad location responsive to higher than threshold cylinder head temperature or lower than threshold water quality;
spraying water first on the brake pad location, and then on the vehicle tire location responsive to higher than threshold brake pad age;
spraying water first on the vehicle tire location, and then on the brake pad location responsive to higher than threshold tire temperature.

16. The method of claim 15, further comprising, responsive to the operator input indicating a request for potable water, disabling the spraying and processing the water in the reservoir via a distiller.

17. The method of claim 15, further comprising, responsive to the navigational input indicating entry of the vehicle in a low emissions zone, spraying the water only on the tire location and the brake pad location.

18. A vehicle system, comprising:
an engine including an intake manifold and a cylinder;
a water harvesting system including an extractor for dehumidifying ambient air, a first collector for collecting condensate from a vehicle air conditioning unit, a second collector for collecting condensate from channels provided on a vehicle surface, and a reservoir system including a plurality of reservoirs for storing water received from each of the extractor, the first and the second collector;
a water level sensor coupled to each of the plurality of the reservoirs of the reservoir system;
a tire nozzle for spraying water on a vehicle tire;
a brake nozzle for spraying water on a brake pad;
an engine nozzle for spraying water onto a cylinder head;
an injector for injecting water directly into an engine cylinder;
a vehicle speed sensor; and
a controller with computer readable instructions that when executed causes the controller to:
collect water from each of the extractor and the first and second collectors;
while vehicle speed is higher than a threshold, continuously spray water via the tire nozzle while intermittently spraying water via the engine nozzle responsive to cylinder head temperature, and not spraying water via the brake nozzle;
while vehicle speed is lower than the threshold, continuously spray water via the brake nozzle while intermittently spraying water via the engine nozzle responsive to cylinder head temperature, and not spraying water via the tire nozzle; and
predict a future water level in the reservoir during a foreseeable drive cycle based on a predicted rate of water generation relative to a predicted rate of water usage.

19. The system of claim 18, wherein the future water level in the reservoir is further based on a current water level in the reservoir;
compare the current water level in the reservoir, sensed via the water level sensor, to the predicted future water level; and
vary a proportion of water sprayed via the tire nozzle or the brake nozzle relative to the engine nozzle based on the comparison.

\* \* \* \* \*